United States Patent [19]

Lange et al.

[11] 4,387,959
[45] Jun. 14, 1983

[54] REAR PROJECTION SCREEN

[75] Inventors: Howard G. Lange, Prospect Heights; Ronald Schulman, Northfield, both of Ill.

[73] Assignee: Zenith Radio Corporation, Glenview, Ill.

[21] Appl. No.: 222,836

[22] Filed: Jan. 6, 1981

[51] Int. Cl.³ ............................................. G03B 21/60
[52] U.S. Cl. .................................................. 350/128
[58] Field of Search ................................ 350/117–129

[56] References Cited

U.S. PATENT DOCUMENTS

| | | |
|---|---|---|
| Re. 29,091 | 12/1976 | De Palma et al. |
| 1,942,841 | 1/1934 | Shimizu . |
| 1,970,358 | 8/1934 | Bull et al. . |
| 2,207,835 | 7/1940 | Sukumlyn . |
| 2,338,654 | 1/1944 | MacNeille . |
| 2,529,701 | 11/1950 | Maloff . |
| 2,531,399 | 11/1950 | Cawein et al. . |
| 2,567,654 | 9/1951 | Siezen . |
| 2,618,198 | 11/1952 | Luboshez . |
| 2,726,573 | 12/1955 | Maloff . |
| 3,523,717 | 8/1970 | Glenn ............................ 350/123 |
| 3,578,841 | 5/1971 | Elmer ............................ 350/127 |
| 3,580,661 | 5/1971 | Cooper .......................... 350/128 |
| 3,672,894 | 6/1972 | Glenn, Jr. . |
| 3,712,707 | 1/1973 | Henkes .......................... 350/122 |
| 3,782,805 | 1/1974 | Brown ........................... 350/129 |
| 3,791,712 | 2/1974 | Miyagi .......................... 350/128 |
| 3,830,556 | 8/1974 | Bratkowski .................... 350/128 |
| 3,832,032 | 8/1974 | Shimada ........................ 350/128 |
| 3,846,012 | 11/1974 | Brown .......................... 350/128 |
| 3,902,787 | 9/1975 | Sherlock ........................ 350/127 |
| 3,938,876 | 2/1976 | Brown .......................... 350/128 |
| 3,966,301 | 6/1976 | Brown .......................... 350/128 |
| 4,012,115 | 3/1977 | Brown .......................... 350/128 |
| 4,054,907 | 10/1977 | Itoh et al. .................... 350/128 X |
| 4,076,384 | 2/1978 | Deml et al. .................... 350/122 |
| 4,078,854 | 3/1978 | Yano ............................ 350/128 |
| 4,165,154 | 8/1979 | Takahaski ...................... 350/128 |
| 4,172,219 | 10/1979 | Deml et al. .................... 350/128 X |

FOREIGN PATENT DOCUMENTS 1531543 2/1976 United Kingdom .

Primary Examiner—Richard A. Wintercorn

[57] ABSTRACT

A single-sheet (i.e. two-surface) rear projection screen for television applications is described, in which the front or viewer-facing surface is formed with vertically running lenticules for horizontal image light distribution and the rear or projector-facing surface is formed with horizontally running lenticules for vertical image light distribution. There is no need for a diffuser. The lenticule profiles on both surfaces vary as a function of distance from the projection axis in a manner calculated to accomplish several optical objectives: collimation, cosine power fall-off compensation, and rearward reflection gradient compensation. Computer programs for calculating the profiles are disclosed.

9 Claims, 7 Drawing Figures

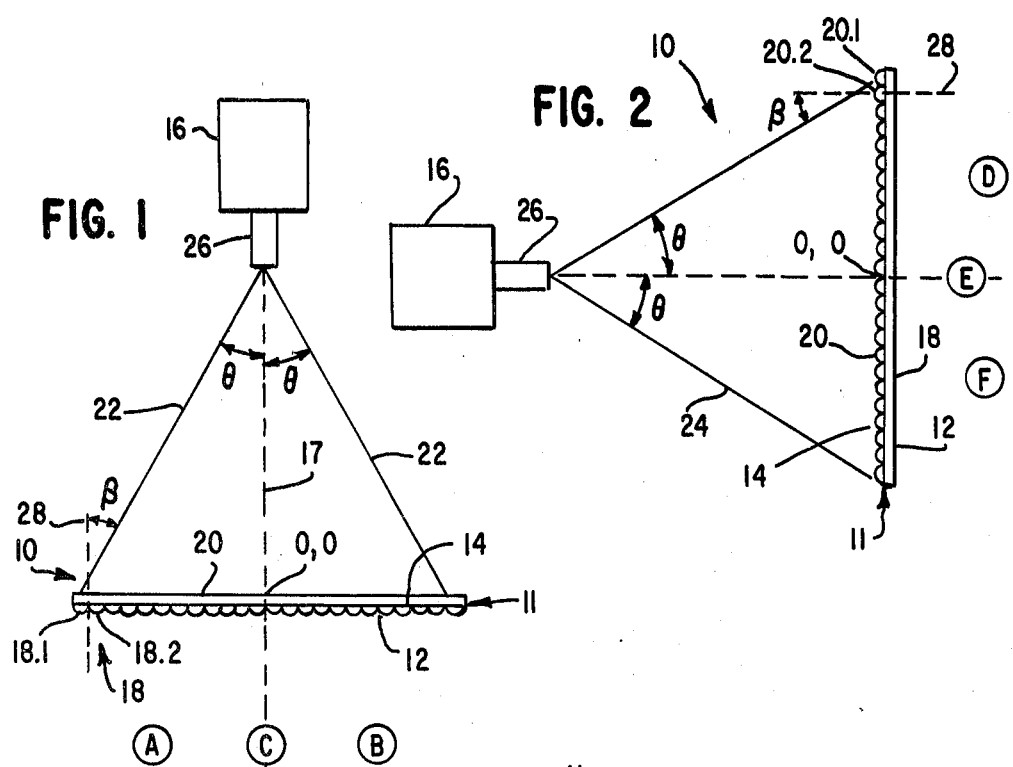
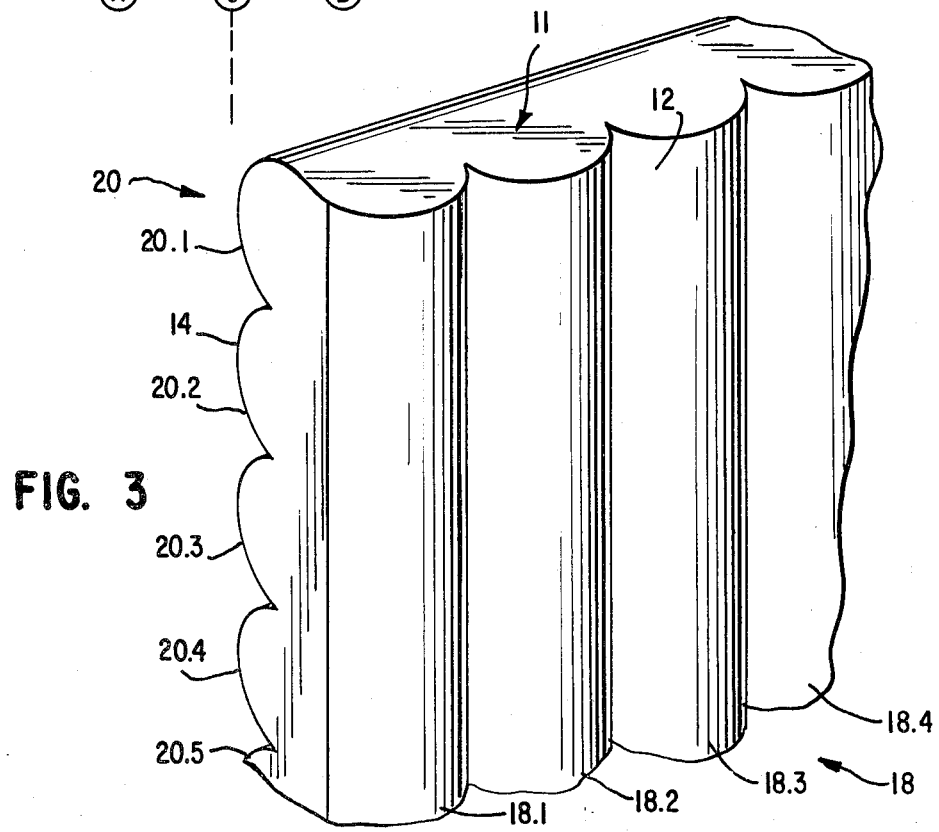

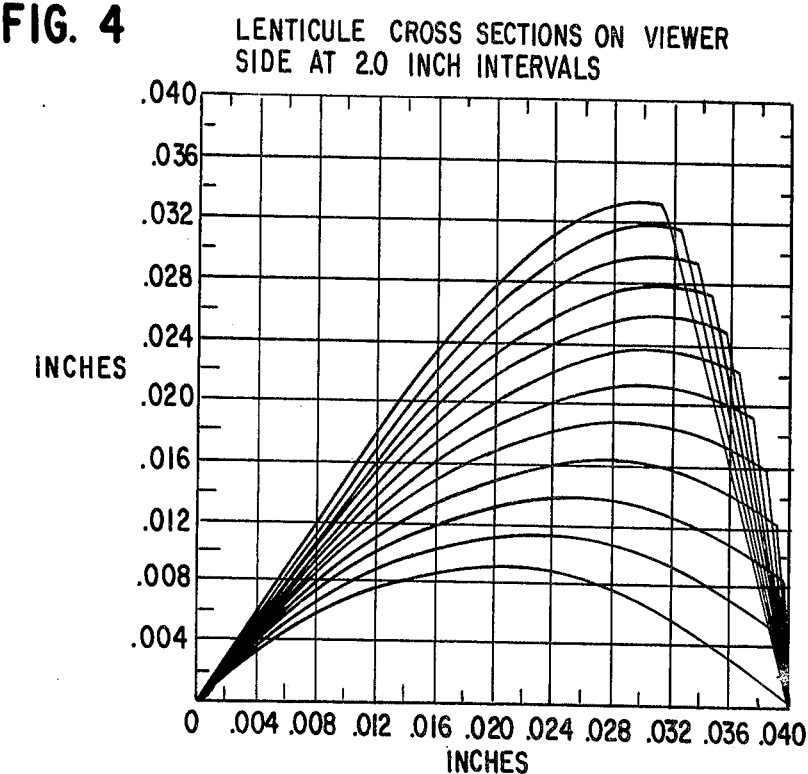
FIG. 4 — LENTICULE CROSS SECTIONS ON VIEWER SIDE AT 2.0 INCH INTERVALS
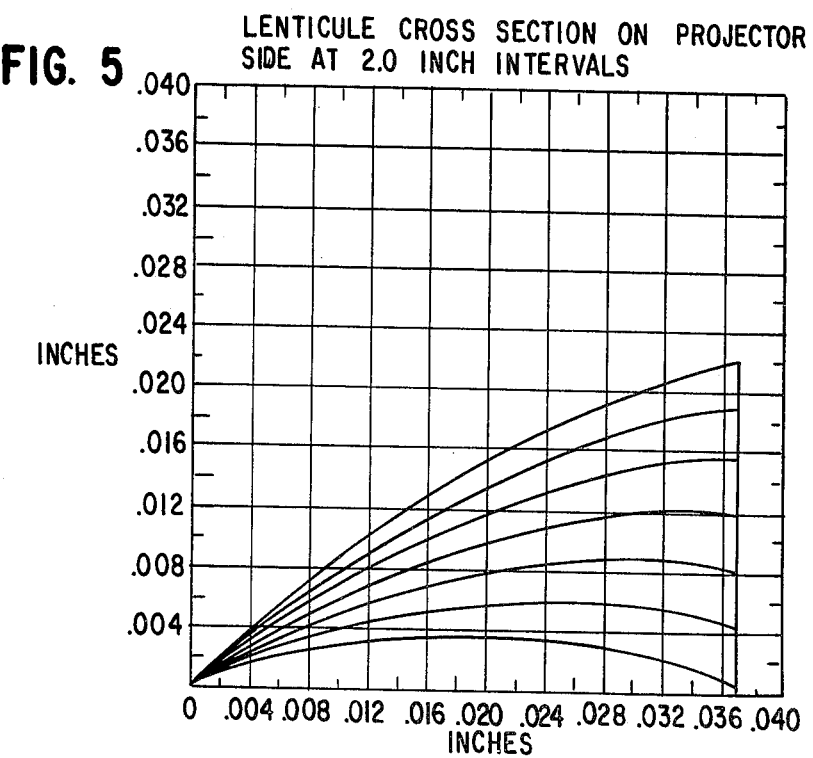
FIG. 5 — LENTICULE CROSS SECTION ON PROJECTOR SIDE AT 2.0 INCH INTERVALS

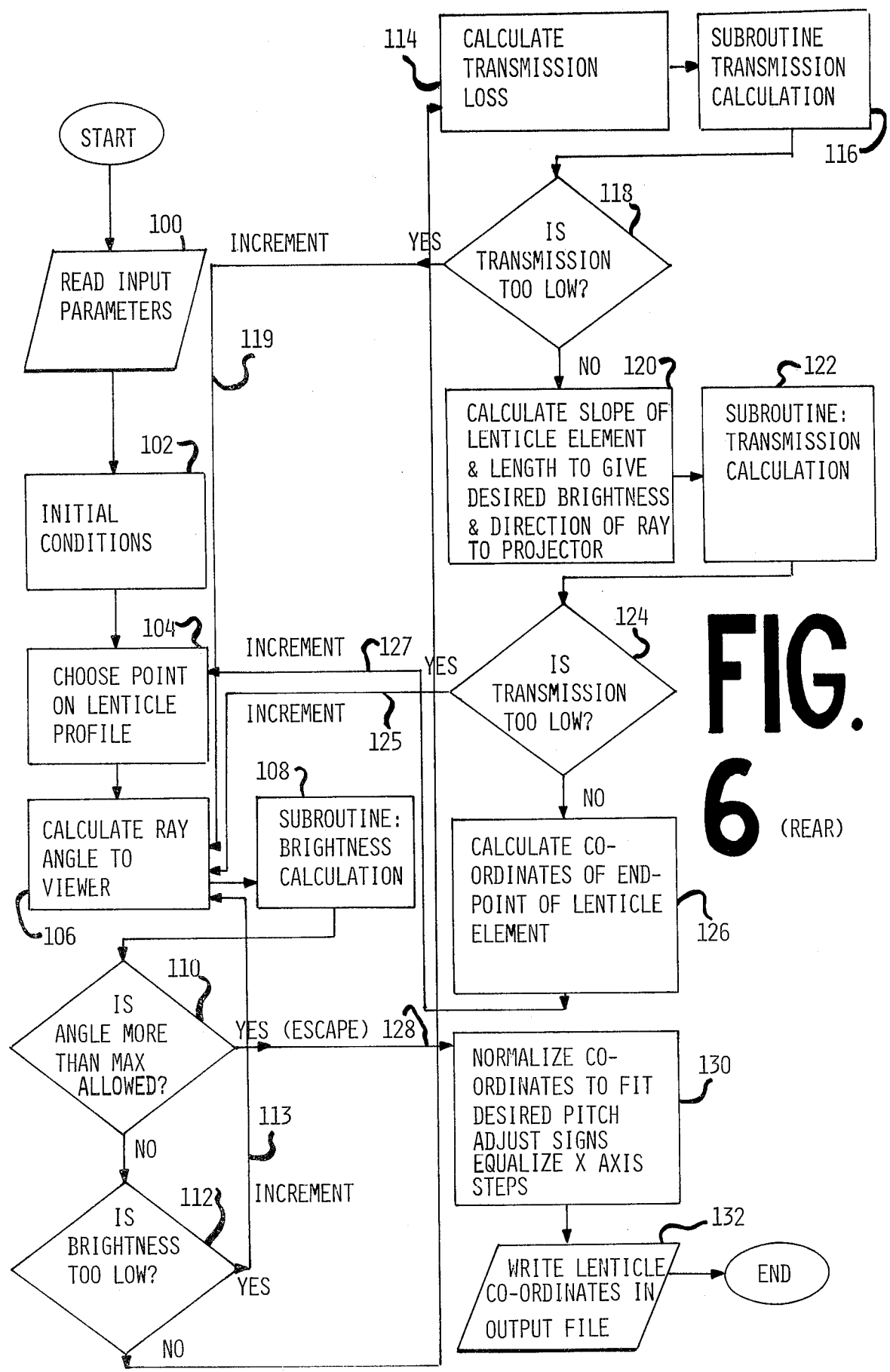
FIG. 6 (REAR)

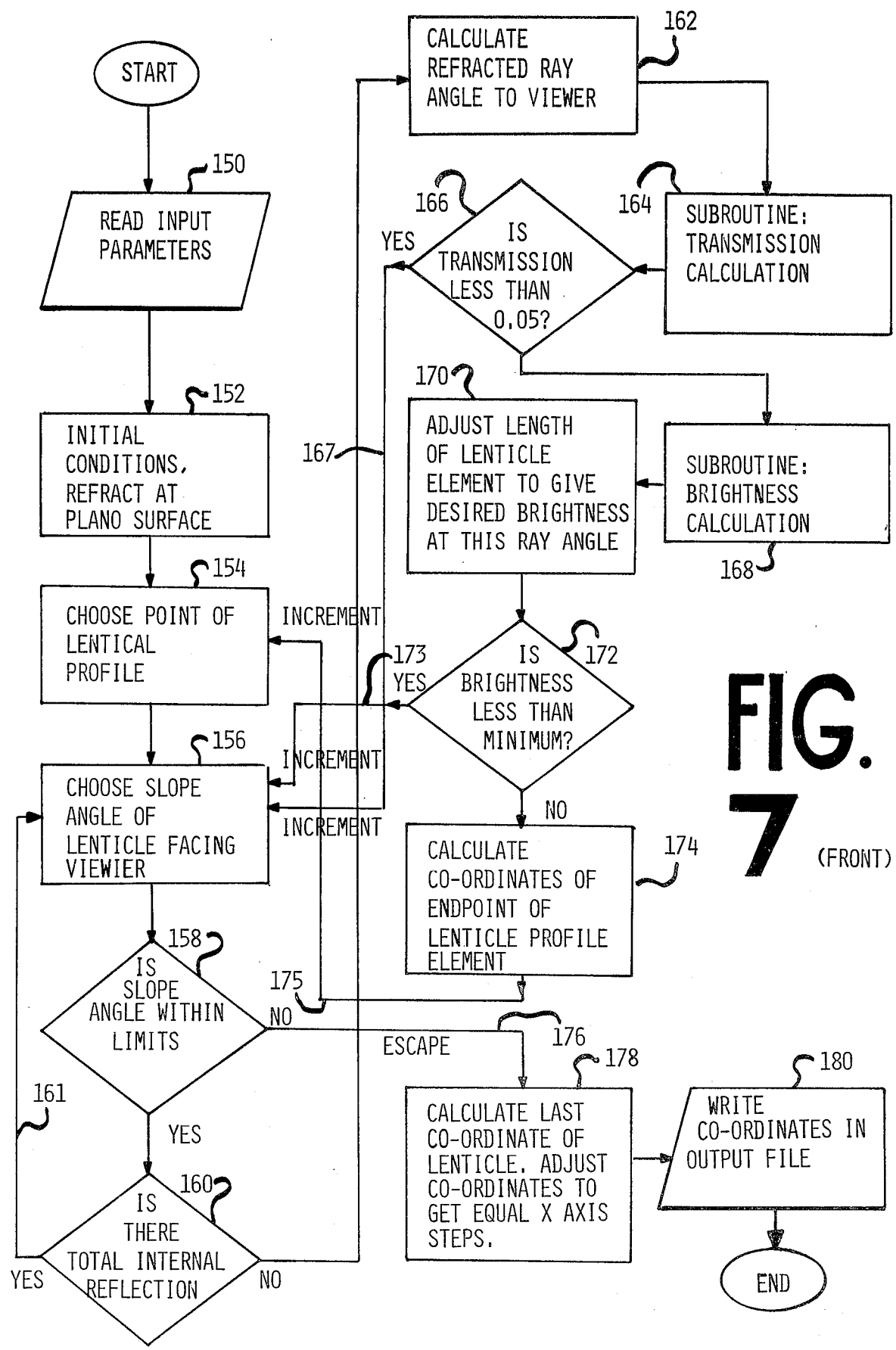
FIG. 7 (FRONT)

REAR PROJECTION SCREEN

This invention relates to image projection screens, such as may be used for projection television systems. It is particularly directed to a screen of the rear projection type which is compensated for reflection losses.

BACKGROUND AND SUMMARY OF THE INVENTION

Image projection systems are employed for a number of applications, including large-screen television. Rear projection systems are those in which the image is projected on the rear surface of the screen, the screen is formed of translucent or transparent material, and the image is therefore visible through the screen to observers located on the front side. Such systems are often preferred for projection TV applications, because they permit the projectors and associated optics to be hidden behind the screen. A disadvantage of the rear projection design, however, is that some of the image light is not transmitted forwardly through the screen, but instead is lost due to rearward reflection from the front and rear surfaces of the screen.

More importantly, the fraction of the total image light which is rearwardly reflected is greater at greater distances from the axis of the projection system. Thus, even if the overall brightness is raised to compensate for reflection losses, the brightness will still be non-uniform; it will decrease from the axis to all four edges of the screen. Consequently, at any given viewing location an observer will find the TV picture to be brighter in the center than it is elsewhere. This invention aims to compensate for such non-uniformity.

It is common for projection screens to employ lenticular lenses for optical processing of the image projected thereon. These are parallel arrays of ridges formed in the surface of the screen, which have light-refracting cross-sectional shapes. Each individual ridge, or lenticule, refracts only a small portion of the image; but the array as a whole processes the entire image. In the past such lenses have been formed in rectilinear arrays and used for distributing the image light over a selected range, vertical or horizontal; so that observers at different heights, or at different azimuths relative to the screen, can all view the same projected image. Prior art screens have also used circular or spiral lenticular arrays, called Fresnel lenses, as "field" lenses for collimating the image light, which arrives in the form of divergent rays.

Some prior art projection screens comprise two or more sheets of material, and thus have at least four surfaces (two forwardly facing and two rearwardly facing) on which to place such lenticular arrays. Other prior art screen designs employ only one sheet (or the equivalent, a plurality of sheets bonded face-to-face). Multi-sheet screens are more expensive to manufacture, and they are more prone to reflections which degrade performance. These include rearward reflections which cut down on transmitted light, as well as forward reflections of ambient light which reduce contrast. Single sheet screens are less expensive and less reflective, but the design constraints are more severe because they have only two surfaces on which to place lenticular arrays. Some of the single sheet designs have a Fresnel field lens on one side for collimation, and a vertical rectilinear lenticular array on the other side for horizontal distribution. Since that takes up all the available surfaces, screens of this type often rely upon a light-diffusing (i.e. translucent rather than transparent) layer to spread the image light vertically.

The use of diffusion for this purpose, however, has its advantages. Diffusion by its nature cannot be confined to the vertical direction, and so it affects the distribution of light in the horizontal direction as well. Diffusion is also a less efficient method of image light distribution than refraction, owing to the significant amount of backward reflection, and also some absorption, attributable to the diffusion layer. In addition ambient light is reflected back to the viewer degrading contrast. The amount of diffusion which occurs is also difficult to control.

If the diffusion element is applied as a surface coating, uniform thickness is difficult to achieve. Such coatings also tend to fill in the valleys between the ridges of a lenticular array. If diffusion is achieved by molding the screen with a rough surface texture, then the mold must be carefully maintained to preserve its surface characteristics over a large number of pressings. Furthermore, some of the resin may adhere to the rough surface of the mold, which reduces the ability of the screen to diffuse light, and also makes its removal from the mold more difficult. Another approach to diffusion is the use of light-dispersing pigment granules or other optically active particles mixed with the screen resin before pressing. It is important, when using this approach, to make sure that the diffusion material is distributed uniformly across the screen, or non-uniform brightness distributions may occur, causing poor image quality. On the other hand, if the diffusion material is distributed throughout the thickness of the screen, as is usually the case, the focal plane of the projected image is not distinct, which results in loss of image sharpness. Another problem is that the presence of the diffusion material may affect the molding and handling characteristics of the resin.

The present invention contemplates a single-sheet (or two-surface) screen design which does not employ diffusion for vertical distribution. It employs a fully transparent, nondiffusive material which is formed into a sheet having a vertically running, horizontally dispersing rectilinear lenticular array one one surface, and a horizontally running, vertically dispersing rectilinear lenticular array on the other surface. Since there is no other surface left on which to form a field lens, the collimating function is built into the refractive characteristics of the two lenticular lenses. Since the angle of incidence of the image light varies from 0° at the axis of the projection system to progressively larger angles with increasing distance from the axis, the collimating function requires the refractive properties of the lenticules to vary as a function of screen position. Hence their cross-sectional shape changes from lenticule to lenticule across the surface of the screen.

Change of lenticule shape as a function of screen coordinate was employed by the prior art for this purpose in a number of spiral or circular Fresnel field lens designs and also in some rectilinear lenticular arrays. Some prior art rectilinear lenticular arrays also change the lenticule cross-sectional shape as a function of screen coordinate for another purpose, i.e., in order to compensate for the cosine power fall-off in image light intensity as a function of angle of ray divergence, which results from the inherent characteristics of the projector focussing lenses.

It appears, however, that no prior art screen varies the lenticule cross-sectional shape as a function of screen coordinate in a manner to compensate even partially for the fact that the reflection losses are greater at greater distances from the projection axis. It is especially important to do this in a screen of the present type, because the use of two orthogonal distributive lenticular arrays would otherwise produce unacceptable brightness gradients in both the vertical and horizontal directions due to the reflection differential across the height and width of the screen.

The problem of reflection loss gradient has been recognized in Strong et al., U.S. Pat. No. 2,200,646. That reference, however, is not concerned with one or more angular ranges of viewing positions. It is only concerned with a linear range of viewing positions extending along the axis, with only the perpendicular distance from the screen as a variable parameter. In Strong the projected image is used only as a cinema backdrop, and thus there is only one "observer", i.e., a movie camera which is always set up in some axial position, rather than a plurality of unpredictable human observers who may take viewing positions above, below, or to either side of the axis. Therefore, the brightness gradient is eliminated only for axial viewing positions at various perpendicular distances from the screen. No compensation is provided for a range of off-axis viewing positions dispersed in any direction parallel to the screen, such as horizontally and vertically. If that screen design were used in a projection TV system, all viewers would have to take up single-file positions directly on the axis, otherwise the brightness of the projected image would vary vertically or horizontally or both.

Moreover, the Strong patent uses the same lenticule cross-sectional shape at each location. The limited degree of compensation for differential reflection which is described in that patent results solely from the fact that the light reaching a given axial viewing position, from any two lenticules having different screen coordinates, is refracted from different facets of the lenticule profile. Thus, no use is made of the concept of lenticule shape change for the purpose of compensating reflection differentials.

In the present invention, the lenticules vary as a function of screen coordinate in such manner that reflection differentials are at least partly compensated for each one of a selected range of viewing positions extending in at least one direction parallel to the screen, e.g., vertically and/or horizontally. The variation is such that, for each viewing position within the selected horizontal and/or vertical viewing range, a greater fraction of the incident image light is directed to that viewing position from those lenticules which are further from the axis than is directed to that viewing position from those lenticules which are closer to the axis. This compensates at least partially for the greater image light loss due to rearward reflection suffered by those lenticules which are further from the axis, as compared to those lenticules which are closer to the axis.

In the preferred form of the invention, both the vertical and horizontal lenticular arrays are so compensated. Thus, at any viewer position within a selected horizontal viewing angle and a selected vertical viewing angle, the observer will see a projected image field which is uniform in brightness from top to bottom and from left to right.

The foregoing background discussion and brief description of the invention, as well as its features and advantages, will be more fully understood by reference to the following detailed description of the preferred embodiment of the invention, when read in conjunction with the following drawings.

BRIEF DESCRIPTION OF THE DRAWINGS

FIG. 1 is a top plan view, schematic in nature, of a rear projection system employing a lenticular screen in accordance with this invention.

FIG. 2 is a side elevational view, schematic in nature, of the same projection system.

FIG. 3 is a perspective view of a fragment of a single-sheet rear projection screen which is employed in the projection system of FIGS. 1 and 2, and which has respective lenticular arrays on opposite faces thereof.

FIGS. 1, 2 and 3 are intended to represent the invention in a qualitative fashion only, as patent drawings usually do, and therefore are not drawn to scale.

FIGS. 4 and 5, on the other hand, which are profile diagrams of screen lenticules used in FIGS. 1 through 3, are drawn substantially to scale in order to represent quantitatively, and with precision, a typical sequence of lenticule cross-sectional shapes in accordance with this invention. Scales are provided in inches along the axes of these drawings, and the specific dimensions indicated are for a particular embodiment of the invention which is preferred. The illustrated profiles exemplify the nature of the changes in the cross-sectional shapes of the lenticules across the screen, and also the rates of such changes, for a particular set of screen dimensions and a particular set of engineering objectives and design parameters; but the scope of protection to be afforded this invention of course extends to any set of design conditions.

FIG. 4 is in the nature of a horizontal cross-section, and shows the light refracting cross-sectional profiles of an incomplete but representative number of lenticules selected from a vertically extending, horizontally distributing array formed on the front (viewer) side of the rear projection screen of FIGS. 1 through 3.

FIG. 5 is in the nature of a vertical cross-section, and shows the light-refracting cross-sectional profiles of an incomplete but representative number of lenticules selected from a horizontally extending, vertically distributing array formed on the rear (projector) side of the rear projection screen of FIGS. 1 through 3.

FIG. 6 is a flow chart summarizing a computer program for calculating the profiles of the lenticules on the projector side of the lenticular screen of this invention.

FIG. 7 is a flow chart summarizing a computer program for calculating the profiles of the lenticules on the viewer side of the lenticular screen of this invention.

DETAILED DESCRIPTION OF THE PREFERRED EMBODIMENT

As seen in FIGS. 1 through 3, an upright rear projection screen 10 in accordance with this invention preferably comprises a single sheet 11 formed of plastic material by any conventional process, such a compression-molding, casting, or roller extrusion. The invention, however, could just as well be used with two or more such sheets bonded together face-to-face in order to form a unitary structure having only one forward facing surface and one rearward facing surface, because in that case the bonded sheet would in effect have only two air interfaces at which undesirable forward or rearward reflections can take place. The invention could be applied to multiple sheet screen designs also, but that would not be preferable because then there would be four or more air interfaces at which reflection losses could occur.

Any of the conventional light-transmitting polymers which are ordinarily used in the art to form rear projection screens will be satisfactory for this purpose; but, since diffusion is not relied on for light distribution in this invention, best results will be obtained with a fully transparent material having no pigment granules or other optically active substances incorporated therein. It also follows that the surface of the sheet 10 should be smooth (untextured) on a sublenticular scale, and no diffusion coating should be employed. But the invention, if desired, may be employed with an opaque dark coating (not shown) distributed, in a pattern known to the art, so as to form a black surround to reduce the reflection of ambient light incident upon the front (viewer) surface of the screen, and thus improve the contrast (or optical signal-to-noise ratio).

A projector 16 on the rear side of the screen 10 has a generally horizontal optical axis 17, which intersects the screen at an axial point designated 0,0 because it forms the origin of a system of x, y rectangular coordinates useful for designating lenticule positions on either side of the screen 10. Normally, but not necessarily, the projection system would be arranged so that the origin is at the geometric center of the screen. The rectangular coordinates of which we will speak are oriented horizontally (x) and vertically (y) respectively, and both of them numerically increase in positive and negative directions from the origin as is conventional.

The sheet 11 has only two surfaces available on which to form lenticular arrays: a front surface 12 facing viewers A through F; and a rear surface 14 facing projector 16. A vertically running array 18 of parallel rectilinear lenticules 18.1, 18.2, etc. is formed on the front screen surface 12 for the purpose of horizontally distributing the image light supplied by projector 16 to viewers A, B, and C who are at locations dispersed horizontally over a range extending to both sides of axis 17; i.e., these viewers are seated at different azimuth positions relative to screen 10. A horizontally running array 20 of parallel rectilinear lenticules 20.1, 20.2, etc. is formed on the rear surface 14 for the purpose of vertically distributing the image light supplied by projector 16 to viewers D, E, and F who are at locations dispersed vertically over a range extending from above and below axis 17; e.g., these viewers are people of different sizes sitting in chairs of different heights located at different distances from the screen. The lenticules may be conveniently formed by compression molding, as is conventional in the art. The use of such lenticular arrays for vertical and/or horizontal distribution of image light is old, as is the concept of a screen comprising a single sheet.

The range of horizontal light distribution exceeds the range of vertical distribution, because there is not as much angular difference vertically between the heads of seated viewers as there is horizontally between chair locations. It is an inherent property of projection screens that the overall brightness of a projected image has a profile which unavoidably decreases with increasing angle of view, relative to the screen axis, in the vertical and horizontal directions. Conventionally, the useful angular range is arbitrarily defined as that which is bounded by the half-brightness fall-off angles. In a typical design the vertical half-brightness fall-off need only be of the order of 8° above and below the axis, whereas the horizontal half-brightness fall-off should be of the order of 22.5° left and right of the axis in order to optimize viewer locations and screen brightness.

Since the angular range of vertical distribution is the smaller of the two, the horizontally running, vertically distributing array 20 has less re-entrant groove area. Preferably, then, lenticule array 20 is chosen to be located on the rear surface 14 so as to minimize the rearward reflection of image light from re-entrant areas. The black surround coating, if used, is located on the front surface, which permits the use of a thicker and therefore stronger screen, and allows a greater thickness tolerance and a greater tolerance for inaccuracies in the deposition pattern of the black coating. This is because the coating has gaps which must be located at the foci of the opposite lenticules 20, and these foci are smaller and/or can be located further from the lenticules 20 when the latter have a smaller angular light spread.

It is old in this art to vary the light-refracting cross-sectional shapes of lenticules 18,1, 18.2, etc. and/or 20.1, 20.2, etc. for certain purposes as a function of the distance of the lenticules from origin 0,0. Thus, image rays such as 22 which strike at or near the horizontal extremes of the screen 10 have a larger angle of incidence $\beta$ measured relative to a screen-normal line 28, than those rays which strike at or near the axis 17. The same may be said for rays 24 which strike at or near the vertical extremes. The prior art, accordingly, varied the light-refracting cross-sectional shapes of these lenticules as a function of horizontal and vertical screen coordinates so as to refract the image rays more at screen locations more distant from the origin, and less at screen locations less distant from the origin. This serves to collimate the image rays without the need for a separate field lens such a circular or spiral Fresnel, an important consideration in a single-sheet screen design which has no room for a separate field lens. The present invention, in common with the prior art, varies the lenticule profiles in arrays 18 and 20 in this manner and for this purpose.

Additionally, any off-axis ray (such as 22 and 24) suffers a loss in intensity which is a function of a power of the cosine of the divergence angle $\theta$ between that ray and the axis 17, a fact which results from the inherent characteristics of the focussing lens assembly 26 of projector 16. The prior art has compensated for this effect by varying the shape of the lenticules as a function of vertical and/or horizontal screen coordinate so that more image light is refracted to any given viewer position by those lenticules 18 or 20 which are further away from the axis 17 than is refracted thereto by those lenticules 18 or 20 which are closer to the axis. In common with the prior art, this invention also varies the lenticule shapes in both arrays for this purpose.

As recognized in the Strong patent, there is yet another parameter which varies as a function of screen coordinate. The rays (such as 22 and 24) which are further from the axis 17 have a higher angle of incidence $\beta$ than those nearer the axis, and as a result the fraction of the image light which is lost because of backward reflection from the air interfaces (front and back surfaces 12 and 14 of the sheet 11) is greater as distance from the axis 17 increases. If this is uncorrected, an observer at any viewing position will notice that the projected image is brighter at the center of screen 10 (origin 0,0) than it is at any location above, below or on either side thereof. Even if the compensation scheme of Strong et al. is employed, the same problem is encountered for all viewing positions which are off-axis. Strong, as noted, does not suggest changing the lenticule profile as a function of screen coordinate, and uses a constant lenticule profile to compensate only for axial viewing positions.

In accordance with this invention the lenticule profile (i.e., the cross-sectional shape which determines its refractive characteristics) varies as a function of distance from the origin 0,0 in such manner that the reflection loss gradient is at least partly compensated. The profile variation occurs in all four rectangular coordinate directions leading away from the origin 0,0: i.e., up, down, left and right; or $+y$, $-y$, $-x$ and $+x$. The purpose of the profile variation is to insure that, at any given viewing position within a selected angular viewing range, an observer will see an image frame on the screen 10 which appears more nearly uniformly bright from side to side and also from top to bottom. Moreover, the angular viewing range within which this desirable result is obtained should not be limited to a linear locus (such as the screen axis 17) as the prior art did; but should constitute a solid angle extending above, below and on both sides of the axis, so that a large fraction of the space in front of screen 10 is available for viewing on a compensated basis.

The design objective of the invention is to insure that, for any given position within the angular viewing range, the fraction of the incident image light which is refracted to that position becomes larger as the absolute value of the lenticule screen location coordinate increases, i.e., as the positive or negative value of x or y increases, for lenticule arrays 18 and 20. The profile variation of lenticule array 18 compensates at least partly for the horizontal reflection gradient, so that observers A, B and C all see an image frame which appears more nearly uniformly bright from side to side; while the profile variation of lenticule array 20 compensates for the vertical reflection gradient, so that observers D, E and F all see an image frame which appears more nearly uniformly bright from top to bottom.

By way of example, lenticule 18.1 loses by rearward reflection more of the image light incident thereon than does lenticule 18.2. The former is more remote from axis 17 than is the latter; therefore the angle of incidence $\beta$ of the incident light (measured relative to screen normal 28) is larger for lenticule 18.1 than it is for lenticule 18.2; and the physical laws of reflection require that the fraction of the incident radiation which is reflected from the air-screen interfaces increases, and the fraction which crosses those interfaces decreases, for increasing values of $\beta$. The same is true for the other array 20; for example, when lenticule 20.1 is compared with lenticule 20.2.

Consequently, if lenticules 18.1 and 18.2 were shaped so that they both refracted toward any given observer position A, B or C, the same fraction of the image light which succeeds in crossing the reflecting interfaces, then a stronger signal would come to that position from lenticule 18.2 than from lenticule 18.1, because the former has more interface-crossing light available to it. The portion of the image which an observer at any position A through C receives from lenticule 18.1 would then appear dimmer than the portion received by that observer from lenticule 18.2. Thus, a portion of the image within a vertical band at the edge of the screen 10 corresponding to lenticule 18.1 would be dimmer than the adjacent vertical band corresponding to lenticule 18.2. For the same reasons, a similar brightness differential would appear between any other pair of vertical lenticules in array 18 which have different absolute values of the x screen coordinate, and any pair of horizontal lenticules in array 20 which have different absolute y coordinate values.

The invention, however, introduces a difference in refractive profile between each pair of lenticules, and calculates these different profiles so that a greater fraction of the available image light is directed to any given observer position such as A, B or C by the more remote (higher absolute x coordinate value) lenticules in array 18 than is directed to that same position by the less remote (lower absolute x coordinate value) lenticules in that array. Similarly, a greater fraction of the available image light is directed to any given observer position such as D, E, or F by the more remote (higher absolute y coordinate value) lenticules in array 20 than is directed to that same position by the less remote (lower absolute y coordinate value) lenticules in that array.

Obviously, it is a physical impossibility of the more remote lenticules to increase the fraction of the available light which they direct to every observer position simultaneously, because any particular lenticule only has a finite amount of interface-crossing image light available to it for refraction, and it must function within those supply limits. Therefore, the invention selects a particular vertical angle and a particular horizontal angle as the viewing ranges within which the arrays 18 and 20 will be compensated for reflection loss differentials, and accepts the fact that observers taking viewing positions outside those ranges will not see a controlled brightness distribution across the image frame. Once these design limits have been chosen, lenticule array 18 is designed so that each lenticule steals some light from those viewing angles which are outside the horizontal target range, and redistributes the stolen light as necessary to increase the amount which is refracted to viewing positions such as A, B and C which are within the horizontal target range. In similar fashion, lenticule array 20 is designed to steal light from viewing angles which are outside the vertical target range, and use it to increase the amount refracted to observer locations D, E and F within the range.

The lenticules which are more remote from the axis 17 must steal the most light, and therefore have the narrowest compensated viewing angle. Thus, the maximum vertical and horizontal viewing angles for which full reflection compensation is achieved by the most extreme lenticules (e.g., 18.1 and 20.1) in each array must be at least equal to the minimum vertical and horizontal viewing angles which are selected as design targets for the screen as a whole.

The particular sequence of lenticule profiles for each array 18 and 20 which will achieve such reflection compensation depends upon a number of design conditions, such as the desired compensation profile (i.e., how close to uniform brightness one can get for the worst viewing portions within the compensated viewing range), the vertical and horizontal screen dimensions, the spacing of the lenticules within each array, the index of refraction of the screen material, the distance from projector to screen, the minimum expected angular spacing between viewers, the shape of the average or overall screen brightness fall-off profile as a function of observer azimuth relative to the screen, the curvature (if any) of the screen, the average screen-to-viewer distance, the desired half-brightness fall-off azimuth angles, and of course, the limits of the ranges of vertical and horizontal viewing angles within which reflection loss compensation is to be accomplished.

Thus, the particular sets of lenticule profiles which are quantitatively illustrated in FIGS. 4 and 5 are applicable only to a particular preferred set of design conditions, such as a screen material having an index of refraction of 1.4913, a horizontal half-brightness fall-off azimuth angle of 22.5° on each side of the axis, a vertical half-brightness fall-off angle of 8° above and below the axis, horizontal and vertical reflection compensation angular ranges which are selected to be equal to the horizontal and vertical half-brightness fall-off angles respectively, and triangular fall-off profiles for both the brightness variation across the screen and the average or overall screen brightness as a function of observer azimuth. While the best way to disclose an invention of this nature is to illustrate such a preferred embodiment to scale, as has been done in FIGS. 4 and 5, it will be appreciated that the invention is broadly applicable to all sets of design conditions, and that the design principles exemplified by FIGS. 4 and 5 may be generalized to any other conditions.

The sets of lenticule profiles in FIGS. 4 and 5 are not complete; because for brevity they show only a portion of only one half (left or right, top or bottom) of a screen; and because for clarity they include only sample profiles selected at regular intervals, omitting the intermediate lenticules between sample points. But those profiles which are shown are sufficiently representative to indicate entire vertical and horizontal half-screen sequences by providing a basis for interpolation of the intermediate lenticule profiles; and the opposite half-screen sequences are mirror images thereof. Thus, it is only necessary that the profiles which are illustrated indicate the nature of the changes in lenticule profile, and the rates of those changes, from each sample point to the next.

The calculations required to generate the lenticule profiles for a screen of any practical size are both complicated and time-consuming. Therefore, the best mode of performing such calculations is by means of a suitably programmed general purpose digital computer. Accordingly, there is set forth in an Appendix to this specification a print-out of the computer program listing used to generate the sets of lenticule profiles exemplified by FIGS. 4 and 5. These profile sets incorporate changes in lenticule profile as a function of screen coordinate which are designed to partially compensate for the reflection loss gradient in accordance with this invention; and in accordance with a preferred embodiment they are also designed to compensate for the cosine power fall-off as a function of screen coordinate, and to perform the collimating function as well in order to eliminate the need for a separate Fresnel or other type of field lens.

The first of these programs, entitled PROJ4B, is used to calculate the lenticule profiles on the projector side of the screen; and the second, entitled PROJ3ATAB, is used to calculate the lenticule profiles on the viewer side of the screen. PROJ4B is summarized in flow chart form in FIG. 6, and PROJ3ATAB in FIG. 7.

As indicated in FIG. 6, the projector-side lenticule profiles are calculated by first reading a set of input parameters (flow chart step 100). These parameters include a first lenticule screen location, the screen-to-viewer distance, the lens-to-screen distance, the screen index of refraction, the desired shape of the brightness distribution (e.g. linear), the desired half-brightness angle, the desired lenticule period (i.e. the lenticule spacing), the X-axis increments at which one wishes to calculate the slope angles of successive lenticule profile elements (i.e. the resolution of the profile calculation), and an initial slope angle.

Then from these parameters a set of initial conditions is calculated (flow chart step 102), and a point on the lenticule profile is chosen (flow chart step 104) at which to calculate the slope and length of an initial lenticule profile element. For this point and these conditions a starting ray angle to the viewer is calculated (flow chart step 106), and the brightness of the ray is calculated by means of a subroutine (flow chart step 108).

At first, the angle calculated will not be more than the maximum allowed (flow chart step 110), and so the program tests to see if the brightness is too low (flow chart step 114). If it is too low, then the ray angle in flow chart step 106 is incremented (arrow 113) and the program resumes from flow chart step 106. If not, then the transmission loss is calculated (flow chart step 114), using a transmission calculation subroutine (flow chart step 116).

If the resulting light transmission is too low (flow chart step 118), the ray angle in flow chart step 106 is incremented (arrow 119), and the program resumes from flow chart step 106. If not, the program calculates the slope angle and length of a lenticule element necessary to give the desired brightness and ray angle (flow chart step 120).

Then a transmission calculation subroutine (flow chart step 122) is employed to calculate the light transmission once again. If the transmission is too low (flow chart step 124), the ray angle in flow chart step 106 is incremented (arrow 125) and the program resumes from flow chart step 106. If not, then the coordinates of the endpoint of the lenticule profile element are calculated (flow chart step 126) and the program increments (arrow 127) the point on the lenticule profile in flow chart step 104 and resumes from that step.

After many calculation loops, the angle calculated in flow chart step 106 is more than the maximum allowed (see flow chart step 110), which means that the program has completed its appointed tasks, and it escapes from the loop (arrow 128). After performing a few final calculations (flow chart step 130: normalizing the coordinates of the lenticule profile elements to fit the desired lenticule pitch, adjusting signs, and equallizing the X-axis steps) and writing the lenticule coordinates to the output file (flow chart step 132), it ends.

These steps are then repeated for each different lenticule profile at each different location on the projector side of the screen.

As indicated in FIG. 7, the viewer-side lenticule profiles are calculated by first reading a set of input parameters (flow chart step 150). These parameters include a first lenticule screen location, the screen-to-projector distance, the lens-to-screen distance, the screen index of refraction, the desired shape of the brightness distribution (e.g. linear), the desired half-brightness angle, the desired lenticule period (i.e. the lenticule spacing), and the X-axis increments at which one wishes to calculate the slope angles of successive lenticule profile elements (i.e. the resolution of the profile calculation).

Then from these parameters a set of initial conditions is calculated (flow chart step 152), and an initial point on the lenticule profile is chosen (flow chart step 154) at which to calculate the slope and length of an initial lenticule profile element. For this point and these conditions a starting lenticule profile elements slope is chosen (flow chart step 156).

At first, the slope chosen will not be more than the maximum allowed (flow chart step 158), and so the program tests to see if total internal reflection results (flow chart step 160). If so, then the slope angle in flow chart step 156 is incremented (arrow 161) and the program resumes from flow chart step 156. If not, then the refraction angle is calculated (flow chart step 162) and a light transmission calculation is performed, using a transmission calculation subroutine (flow chart step 164).

If the resulting light transmission is below a selected minimum (flow chart step 166), the slope angle in flow chart step 156 is incremented (arrow 167), and the program resumes from flow chart step 156. If not, the desired brightness at the viewing angle under consideration is calculated by means of a brightness calculation subroutine (flow chart step 168), and the lenticule element length necessary to produce the desired brightness is then calculated (flow chart step 170).

If the brightness is below a selected minimum (flow chart step 172), the slope angle in flow chart step 156 is incremented (arrow 173) and the program resumes from flow chart step 156. If not, then the coordinates of the endpoint of the lenticule profile element are calculated (flow chart step 174) and the program increments the point on the lenticule profile in flow chart step 154 and resumes from that point.

After many calculation loops, the incremented angle in flow chart step 156 exceeds the maximum allowed (see flow chart step 158), which means that the program has completed its appointed tasks, and it escapes from the loop (arrow 176). After performing a few final calculations (flow chart step 178: calculating the last coordinate of the lenticule and adjusting the coordinates to equallize the X-axis steps) and writing the lenticule coordinates to the output file (flow chart step 180), it ends.

These steps are then repeated for each different lenticule profile at each different location on the viewer side of the screen.

The result is an economical single-sheet type of rear projection screen which combines therein the collimating and the horizontal and vertical light distributing function and which is advantageously compensated for cosine power fall off of the incident image light intensity. This screen is also, for the first time, compensated for the reflection loss gradient over a range of off-axis viewing poitions, over both vertical and horizontal angular viewing ranges. And also for the first time, compensation for the reflection loss gradient is achieved by means of a sequence of lenticule profile changes as a function of one or more screen coordinates.

The described embodiments represent the preferred form of the invention, but alternative embodiments may be imagined which would come within the novel teachings herein. Accordingly, these embodiments are to be considered as merely illustrative, and not as limiting the scope of the following claims.

The invention claimed is:

1. A projection screen for use with projection means located rearwardly of said screen for displaying an image to a plurality of observers located at viewing positions which are on the front side of said screen and dispersed in a direction parallel to said screen;

said projection means defining an axis;

said screen including at least one array of substantially rectilinear lenticules having respective light-refracting cross-sectional shapes adapted to redirect light arriving from the rear side of said screen so that an image formed on said screen by said light is visible at said dispersed positions;

said respective cross-sectional shapes of said lenticules varying as a function of their distance from said axis in such manner that, for each said position within a selected angular viewing range, a greater fraction of the incident image light is directed to that viewing position from those lenticules which are further from said axis than is directed to that viewing position from those lenticules which are closer to said axis, so as to at least partially compensate for the image light rearward reflection loss gradient;

said lenticule cross-sectional shapes being defined by a succession of lenticule profile elements;

the slope angle, length and position of each of said lenticule profile elements being determined by an algorithm which calculates the light transmission provided by each of said lenticule profile elements, and adjusts said slope angles, lengths and positions thereof to achieve said reflection loss gradient compensation.

2. The screen of claim 1 which is formed of fully transparent material and comprises a second array of substantially rectilinear lenticules oriented substantially perpendicularly to the first-mentioned array and having respective light-refracting cross-sectional shapes for redirecting said image light in another direction to observers at viewing positions dispersed in a second screen-parallel direction, whereby to obviate the need for diffusion means.

3. The screen of claim 2 which comprises sheet means having only one forwardly facing surface and only one rearwardly facing surface, one of said lenticule arrays being formed on one of said surfaces and the other of said lenticule arrays being formed on the other of said surfaces.

4. The screen of claim 2 wherein said respective cross-sectional shapes of said lenticules of said second array also vary as a function of their distance from said axis in such manner that, for each said viewing position within a selected second angular viewing range, a greater fraction of the incident image light is directed to that viewing position from those lenticules which are further from said axis than is directed to that viewing position from those lenticules which are closer to said axis, so to at least partially compensate for the image light rearward reflection loss gradient;

said second array lenticule cross-sectional shapes being defined by a succession of lenticule profile elements;

the slope angle, length and position of each of said second array lenticule profile elements being determined by an algorithm which calculates the light transmission provided by each of said lenticule profile elements, and adjusts said slope angles, lengths and positions thereof to achieve said reflection loss gradient compensation.

5. The screen of claim 4 wherein the lenticules on said rearwardly facing surface run substantially horizontally to distribute the image light over a vertical viewing range, and the lenticules on said forwardly facing surface run substantially vertically to distribute the image light over a horizontal viewing range which exceeds said vertical viewing range in size.

6. The screen of claim 1 or 4, wherein said variation of cross-sectional shape as a function of distance from said axis is also such that a greater fraction of the incident image light is directed to a given viewing position from those lenticules which are further from said axis than is directed to that viewing position from those lenticules which are closer to said axis, so as to at least partially compensate for the cosine power fall-off of incident image light as a function of the angle of divergence relative to said axis.

7. The screen of claim 1 or 4, wherein said variation of cross-sectional shape as a function of distance from said axis is also such that the angles of refraction of said lenticules are at least partially compensated for the greater angle of incidence of image light at greater distances from said axis, whereby to perform the collimating function of a field lens.

8. The screen of claim 1 or 4, wherein said variation of cross-sectional shape as a function of distance from said axis is also such that a greater fraction of the incident image light is directed to a given viewing position from those lenticules which are further from said axis than is directed to that viewing position from those lenticules which are closer to said axis, so as to at least partially compensate for the cosine power fall-off of incident image light as a function of the angle of divergence relative to said axis, and said variation of cross-sectional shape as a function of distance from said axis is also such that the angles of refraction of said lenticules are at least partially compensated for the greater angle of incidence of image light at greater distances from said axis, so as to perform the collimating function of a field lens.

9. A method of manufacturing a projection screen for use with projection means located rearwardly of said screen for displaying an image to a plurality of observers located at viewing positions which are on the front side of said screen and dispersed in a direction parallel to said screen;
said projection means defining an axis;
said screen including at least one array of substantially rectilinear lenticules having respective light-refracting cross-sectional shapes adapted to redirect light arriving from the rear side of said screen so that an image formed on said screen by said light is visible at said dispersed positions;
said respective cross-sectional shapes of said lenticules varying as a function of their distance from said axis in such manner that, for each said position within a selected angular viewing range, a greater fraction of the incident image light is directed to that viewing position from those lenticules which are further from said axis than is directed to that viewing position from those lenticules which are closer to said axis, so as to at least partially compensate for the image light rearward reflection loss gradient;
said lenticule cross-sectional shapes being defined by a succession of lenticule profile elements;
said method comprising the steps of:
calculating the light transmission provided by each of said lenticule profile elements;
and adjusting the slope angle, length and position of each of said lenticule profile elements in a manner to alter said light transmission to achieve said reflection loss gradient compensation.

* * * * *